(12) United States Patent
Rub et al.

(10) Patent No.: US 8,572,457 B2
(45) Date of Patent: Oct. 29, 2013

(54) OUTER CODE PROTECTION FOR SOLID STATE MEMORY DEVICES

(75) Inventors: Bernardo Rub, Sudbury, MA (US); Ara Patapoutian, Hopkinton, MA (US); Arvind Sridharan, Longmont, CO (US); Bruce D. Buch, Westborough, MA (US)

(73) Assignee: Seagate Technology LLC, Cupertino, CA (US)

( * ) Notice: Subject to any disclaimer, the term of this patent is extended or adjusted under 35 U.S.C. 154(b) by 641 days.

(21) Appl. No.: 12/790,120

(22) Filed: May 28, 2010

(65) Prior Publication Data

US 2011/0296272 A1    Dec. 1, 2011

(51) Int. Cl.
*H03M 13/00* (2006.01)
*G11C 29/00* (2006.01)
*G06F 11/00* (2006.01)

(52) U.S. Cl.
USPC .............. 714/755; 714/773; 714/810

(58) Field of Classification Search
USPC ......... 714/773, 755, 784, 758, 800, 786, 810; 365/230.03, 185.33; 65/174
See application file for complete search history.

(56) References Cited

U.S. PATENT DOCUMENTS

| | | | |
|---|---|---|---|
| 7,739,576 B2 | 6/2010 | Radke | |
| 7,844,879 B2 * | 11/2010 | Ramamoorthy et al. | 714/763 |
| 7,876,638 B2 * | 1/2011 | Pekny | 365/230.03 |
| 8,055,979 B2 * | 11/2011 | Wu et al. | 714/773 |
| 8,244,960 B2 * | 8/2012 | Paley et al. | 711/103 |
| 8,266,495 B2 * | 9/2012 | Yang et al. | 714/755 |
| 2007/0033362 A1 * | 2/2007 | Sinclair | 711/165 |
| 2007/0171714 A1 | 7/2007 | Wu et al. | |
| 2009/0013234 A1 | 1/2009 | Radke | |
| 2010/0174846 A1 * | 7/2010 | Paley et al. | 711/103 |
| 2011/0060969 A1 * | 3/2011 | Ramamoorthy et al. | 714/773 |
| 2011/0296273 A1 * | 12/2011 | Rub | 714/755 |
| 2012/0278679 A1 * | 11/2012 | Rub et al. | 714/755 |
| 2012/0331368 A1 * | 12/2012 | Yang et al. | 714/755 |

FOREIGN PATENT DOCUMENTS

WO    WO 2007/010189    1/2007

* cited by examiner

*Primary Examiner* — Phung M Chung
(74) *Attorney, Agent, or Firm* — Hollingsworth Davis, LLC

(57) ABSTRACT

Outer code words can span multiple data blocks, multiple die, or multiple chips of a memory device to protect against errors in the data stored in the blocks, die and/or chips. A solid state memory device is arranged in multiple data blocks, each block including an array of memory cells arranged in a plurality of pages. The data is encoded into inner code words and symbol-based outer code words. The inner code words and the symbol-based outer code words are stored in the memory cells of the multiple blocks. One or more inner code words are stored in each page of each block and one or more symbols of each outer code word are stored in at least one page of each block. The inner code words and the outer code words are read from the memory device and are used to correct the errors in the data.

20 Claims, 18 Drawing Sheets

| Inner Codeword 0 | b0$_0$ | b1$_0$ | b2$_0$ | | Inner Parity | Page 0 of Block 0 of Die 0 |
| --- | --- | --- | --- | --- | --- | --- |
| Inner Codeword 1 | b0$_1$ | b1$_1$ | b2$_1$ | | Inner Parity | Page 0 of Block 1 of Die 0 |
| Inner Codeword 2 | b0$_2$ | b1$_2$ | b2$_2$ | | Inner Parity | Page 0 of Block 2 of Die 0 |
| Inner Codeword 3 | b0$_3$ | b1$_3$ | b2$_3$ | | Inner Parity | Page 0 of Block 3 of Die 0 |
| ⋮ | | | | | | |
| Inner Codeword K-2 | b0$_{K-2}$ | b1$_{K-2}$ | b2$_{K-2}$ | | Inner Parity | Page 0 of Block K-2 of Die 0 |
| | b0$_{K-1}$ | b1$_{K-1}$ | b2$_{K-1}$ | Outer Parity | Inner Parity | Page 0 of Block K-1 of Die 0 |

*Figure 5A*

| Inner Codeword 0 | b0$_0$ | b1$_0$ | b2$_0$ | | Inner Parity | Page 0 of Block 0 of Die 0 |
| --- | --- | --- | --- | --- | --- | --- |
| Inner Codeword 1 | b0$_1$ | b1$_1$ | b2$_1$ | | Inner Parity | Page 0 of Block 0 of Die 1 |
| Inner Codeword 2 | b0$_2$ | b1$_2$ | b2$_2$ | | Inner Parity | Page 0 of Block 0 of Die 2 |
| Inner Codeword 3 | b0$_3$ | b1$_3$ | b2$_3$ | | Inner Parity | Page 0 of Block 0 of Die 3 |
| ⋮ | | | | | | |
| Inner Codeword J-2 | b0$_{J-2}$ | b1$_{J-2}$ | b2$_{J-2}$ | | Inner Parity | Page 0 of Block 0 of Die J-2 |
| | b0$_{J-1}$ | b1$_{J-1}$ | b2$_{J-1}$ | Outer Parity | Inner Parity | Page 0 of Block 0 of Die J-1 |

*Figure 5B*

| | Outer Codeword 0 | Outer Codeword 1 | Outer Codeword 2 | Outer Codeword 3 | Outer Codeword 4 | | |
|---|---|---|---|---|---|---|---|
| Inner Codeword 0 | $S_0$ | $S_0$ | $S_0$ | $S_0$ | $S_0$ | ⋯ | Inner Parity |
| | | | | | | ⋯ | |
| | | | | | | ⋯ | |
| | | | | | | CHIP 0, DIE 0 BLOCK 0 | |
| | | | | | | ⋯ | |
| Inner Codeword 1 | $S_1$ | $S_1$ | $S_1$ | $S_1$ | $S_1$ | ⋯ | Inner Parity |
| | | | | | | ⋯ | |
| | | | | | | ⋯ | |
| | | | | | | CHIP 0, DIE 0 BLOCK 1 | |
| | | | | | | ⋯ | |
| Inner Codeword 2 | $S_2$ | $S_2$ | $S_2$ | $S_2$ | $S_2$ | ⋯ | Inner Parity |
| | | | | | | ⋯ | |
| | | | | | | ⋯ | |
| | | | | | | CHIP 0, DIE 0 BLOCK 2 | |
| | | | | | | ⋯ | |
| | ⋮ | | ⋮ | | | ⋮ | |
| Inner Codeword K-3 | $S_{K-3}$ | $S_{K-3}$ | $S_{K-3}$ | $S_{K-3}$ | $S_{K-3}$ | ⋯ | Inner Parity |
| | | | | | | ⋯ | |
| | | | | | | ⋯ | |
| | | | | | | CHIP 0, DIE 0 BLOCK K-3 | |
| | | | | | | ⋯ | |
| Inner Codeword K-2 | $OPS_0$ | $OPS_0$ | $OPS_0$ | $OPS_0$ | $OPS_0$ | ⋯ | Inner Parity |
| | | | | | | ⋯ | |
| | | | | | | ⋯ | |
| | | | | | | CHIP 0, DIE 0 BLOCK K-2 | |
| | | | | | | ⋯ | |
| Inner Codeword K-1 | $OPS_1$ | $OPS_1$ | $OPS_1$ | $OPS_1$ | $OPS_1$ | ⋯ | Inner Parity |
| | | | | | | ⋯ | |
| | | | | | | ⋯ | |
| | | | | | | CHIP 0, DIE 0 BLOCK K-1 | |
| | | | | | | ⋯ | |

*Figure 7A*

| | Outer Codeword 0 | Outer Codeword 1 | Outer Codeword 2 | Outer Codeword 3 | Outer Codeword 4 | | | |
|---|---|---|---|---|---|---|---|---|
| Inner Codeword 0 | $S_0$ | $S_0$ | $S_0$ | $S_0$ | $S_0$ | | Inner Parity | Chip 0, Die 0, Page 0 |
| Inner Codeword 1 | $S_1$ | $S_1$ | $S_1$ | $S_1$ | $S_1$ | | Inner Parity | Chip 0, Die 1, Page 0 |
| Inner Codeword 2 | $S_2$ | $S_2$ | $S_2$ | $S_2$ | $S_2$ | | Inner Parity | Chip 0, Die 2, Page 0 |
| Inner Codeword 3 | $S_3$ | $S_3$ | $S_3$ | $S_3$ | $S_3$ | | Inner Parity | Chip 0, Die 3, Page 0 |
| Inner Codeword J-4 | $S_{J-4}$ | $S_{J-4}$ | $S_{J-4}$ | $S_{J-4}$ | $S_{J-4}$ | | Inner Parity | Chip 0, Die J-4, Page 0 |
| Inner Codeword J-3 | $S_{J-3}$ | $S_{J-3}$ | $S_{J-3}$ | $S_{J-3}$ | $S_{J-3}$ | | Inner Parity | Chip 0, Die J-3, Page 0 |
| Inner Codeword J-2 | $OPS_0$ | $OPS_0$ | $OPS_0$ | $OPS_0$ | $OPS_0$ | | Inner Parity | Chip 0, Die J-2, Page 0 |
| Inner Codeword J-1 | $OPS_1$ | $OPS_1$ | $OPS_1$ | $OPS_1$ | $OPS_1$ | | Inner Parity | Chip 0, Die J-1, Page 0 |

*Figure 7B*

| | Outer Codeword 0 | Outer Codeword 1 | Outer Codeword 2 | Outer Codeword 3 | Outer Codeword 4 | | | |
|---|---|---|---|---|---|---|---|---|
| Inner Codeword 0 | $S_0$ | $S_0$ | $S_0$ | $S_0$ | $S_0$ | | Inner Parity | Chip 0, Die 0, Page 0 |
| Inner Codeword 1 | $S_1$ | $S_1$ | $S_1$ | $S_1$ | $S_1$ | | Inner Parity | Chip 1, Die 0, Page 0 |
| Inner Codeword 2 | $S_2$ | $S_2$ | $S_2$ | $S_2$ | $S_2$ | | Inner Parity | Chip 2, Die 0, Page 0 |
| Inner Codeword 3 | $S_3$ | $S_3$ | $S_3$ | $S_3$ | $S_3$ | | Inner Parity | Chip 3, Die 0, Page 0 |
| Inner Codeword V-4 | $S_{J-4}$ | $S_{J-4}$ | $S_{J-4}$ | $S_{J-4}$ | $S_{J-4}$ | | Inner Parity | Chip V-4, Die 0, Page 0 |
| Inner Codeword V-3 | $S_{J-3}$ | $S_{J-3}$ | $S_{J-3}$ | $S_{J-3}$ | $S_{J-3}$ | | Inner Parity | Chip V-3, Die 0, Page 0 |
| Inner Codeword V-2 | $OPS_0$ | $OPS_0$ | $OPS_0$ | $OPS_0$ | $OPS_0$ | | Inner Parity | Chip V-2, Die 0, Page 0 |
| Inner Codeword V-1 | $OPS_1$ | $OPS_1$ | $OPS_1$ | $OPS_1$ | $OPS_1$ | | Inner Parity | Chip V-1, Die 0, Page 0 |

*Figure 7C*

|                  | Outer Codeword 0 | Outer Codeword 1 | Outer Codeword 2 | Outer Codeword 3 | Outer Codeword 4 |              |                    |
|------------------|:---:|:---:|:---:|:---:|:---:|---|---|
| Inner Codeword 0 | $S_0$ | $S_0$ | $S_0$ | $S_0$ | $S_0$ | Inner Parity | Chip 0, Die 0, Page 0 |
| Inner Codeword 1 | $S_1$ | $S_1$ | $S_1$ | $S_1$ | $S_1$ | Inner Parity | Chip 0, Die 1, Page 0 |
| Inner Codeword 2 | $S_2$ | $S_2$ | $S_2$ | $S_2$ | $OPS_0$ | Inner Parity | Chip 0, Die 2, Page 0 |
| Inner Codeword 3 | $S_3$ | $S_3$ | $S_3$ | $OPS_0$ | $S_2$ | Inner Parity | Chip 0, Die 3, Page 0 |
| Inner Codeword 4 | $S_4$ | $S_4$ | $OPS_0$ | $S_3$ | $S_3$ | Inner Parity | Chip 0, Die 4, Page 0 |
| Inner Codeword 5 | $S_5$ | $OPS_0$ | $S_4$ | $S_3$ | $S_4$ | Inner Parity | Chip 0, Die 5, Page 0 |
| Inner Codeword 6 | $OPS_0$ | $S_5$ | $S_5$ | $S_5$ | $S_5$ | Inner Parity | Chip 0, Die 6, Page 0 |
| Inner Codeword 7 | $S_6$ | $S_6$ | $S_6$ | $S_6$ | $OPS_1$ | Inner Parity | Chip 0, Die 7, Page 0 |
| Inner Codeword 8 | $S_7$ | $S_7$ | $S_7$ | $OPS_1$ | $S_6$ | Inner Parity | Chip 0, Die 8, Page 0 |
| Inner Codeword 9 | $S_8$ | $S_8$ | $OPS_1$ | $S_7$ | $S_7$ | Inner Parity | Chip 0, Die 9, Page 0 |
| Inner Codeword 10 | $S_9$ | $OPS_1$ | $S_8$ | $S_8$ | $S_8$ | Inner Parity | Chip 0, Die 10, Page 0 |
| Inner Codeword 11 | $OPS_1$ | $S_9$ | $S_9$ | $S_9$ | $S_9$ | Inner Parity | Chip 0, Die 11, Page 0 |

*Figure 7D*

| Even Plane | | | | | Odd Plane | | | | | |
|---|---|---|---|---|---|---|---|---|---|---|
| Outer Codeword 0 | Outer Codeword 1 | Outer Codeword 2 | | | Outer Codeword 0 | Outer Codeword 1 | | Outer Codeword G-1 | | |
| $S_0$ | $S_0$ | $S_0$ | 800 | Inner Parity | $S_0$ | $S_0$ | 801 | $S_0$ | Inner Parity | Die 0 |
| $S_1$ | $S_1$ | $S_1$ | 802 | Inner Parity | $S_1$ | $S_1$ | 803 | $S_1$ | Inner Parity | Die 1 |
| $S_2$ | $S_2$ | $S_2$ | 804 | Inner Parity | $S_2$ | $S_2$ | 805 | $S_2$ | Inner Parity | Die 2 |
| $S_3$ | $S_3$ | $S_3$ | 806 | Inner Parity | $S_3$ | $S_3$ | 807 | $S_3$ | Inner Parity | Die 3 |
| $S_{J-4}$ | $S_{J-4}$ | $S_{J-4}$ | 808 | Inner Parity | $S_{J-4}$ | $S_{J-4}$ | 809 | $S_{J-4}$ | Inner Parity | Die J-4 |
| $S_{J-3}$ | $S_{J-3}$ | $S_{J-3}$ | 810 | Inner Parity | $S_{J-3}$ | $S_{J-3}$ | 811 | $S_{J-3}$ | Inner Parity | Die J-3 |
| $OPS_0$ | $OPS_0$ | $OPS_0$ | 812 | Inner Parity | $OPS_0$ | $OPS_0$ | 813 | $OPS_0$ | Inner Parity | Die J-2 |
| $OPS_1$ | $OPS_1$ | $OPS_1$ | 814 | Inner Parity | $OPS_1$ | $OPS_1$ | 815 | $OPS_0$ | Inner Parity | Die J-1 |

*Figure 8*

| | Outer Codeword 0 | Outer Codeword 1 | Outer Codeword 2 | Outer Codeword 3 | Outer Codeword 4 | | | |
|---|---|---|---|---|---|---|---|---|
| Inner Codeword 0 | $S_0$ | $S_0$ | $S_0$ | $S_0$ | $S_0$ | ● ● ● | Inner Parity | Block 0 even |
| Inner Codeword 1 | $S_1$ | $S_1$ | $S_1$ | $S_1$ | $S_1$ | ● ● ● | Inner Parity | Block 0 odd |
| Inner Codeword 2 | $S_2$ | $S_2$ | $S_2$ | $S_2$ | $S_2$ | ● ● ● | Inner Parity | Block 1 even |
| Inner Codeword 3 | $S_3$ | $S_3$ | $S_3$ | $S_3$ | $S_3$ | ● ● ● | Inner Parity | Block 1 odd |
| Inner Codeword 4 | $S_4$ | $S_4$ | $S_4$ | $S_4$ | $S_4$ | ● ● ● | Inner Parity | Block 2 even |
| Inner Codeword 5 | $S_5$ | $S_5$ | $S_5$ | $S_5$ | $S_5$ | ● ● ● | Inner Parity | Block 2 odd |
| ⋮ | ⋮ | | | | ⋮ | | ⋮ | |
| Inner Codeword 2K-4 | $S_{2K-4}$ | $S_{K-4}$ | $S_{2K-4}$ | $S_{2K-4}$ | $S_{2K-4}$ | ● ● ● | Inner Parity | Block K-2 even |
| Inner Codeword 2K-3 | $S_{2K-3}$ | $S_{2K-3}$ | $S_{2K-3}$ | $S_{2K-3}$ | $S_{2K-3}$ | ● ● ● | Inner Parity | Block K-2 odd |
| Inner Codeword 2K-2 | $OPS_0$ | $OPS_0$ | $OPS_0$ | $OPS_0$ | $OPS_0$ | ● ● ● | Inner Parity | Block K-1 even |
| Inner Codeword 2K-1 | $OPS_1$ | $OPS_1$ | $OPS_1$ | $OPS_1$ | $OPS_1$ | ● ● ● | Inner Parity | Block K-1 odd |

*Figure 9A*

| | Outer Codeword 0 | Outer Codeword 1 | Outer Codeword 2 | Outer Codeword 3 | Outer Codeword 4 | | | |
|---|---|---|---|---|---|---|---|---|
| Inner Codeword 0 | $S_0$ | $S_0$ | $S_0$ | $S_0$ | $S_0$ | ● ● ● | Inner Parity | Die 0 even |
| Inner Codeword 1 | $S_1$ | $S_1$ | $S_1$ | $S_1$ | $S_1$ | ● ● ● | Inner Parity | Die 0 odd |
| Inner Codeword 2 | $S_2$ | $S_2$ | $S_2$ | $S_2$ | $S_2$ | ● ● ● | Inner Parity | Die 1 even |
| Inner Codeword 3 | $S_3$ | $S_3$ | $S_3$ | $S_3$ | $S_3$ | ● ● ● | Inner Parity | Die 1 odd |
| Inner Codeword 4 | $S_4$ | $S_4$ | $S_4$ | $S_4$ | $S_4$ | ● ● ● | Inner Parity | Die 2 even |
| Inner Codeword 5 | $S_5$ | $S_5$ | $S_5$ | $S_5$ | $S_5$ | ● ● ● | Inner Parity | Die 2 odd |
| ⋮ | ⋮ | | | | ⋮ | | ⋮ | |
| Inner Codeword 2K-4 | $S_{2K-4}$ | $S_{K-4}$ | $S_{2K-4}$ | $S_{2K-4}$ | $S_{2K-4}$ | ● ● ● | Inner Parity | Die J-2 even |
| Inner Codeword 2K-3 | $S_{2K-3}$ | $S_{2K-3}$ | $S_{2K-3}$ | $S_{2K-3}$ | $S_{2K-3}$ | ● ● ● | Inner Parity | Die J-2 odd |
| Inner Codeword 2K-2 | $OPS_0$ | $OPS_0$ | $OPS_0$ | $OPS_0$ | $OPS_0$ | ● ● ● | Inner Parity | Die J-1 even |
| Inner Codeword 2K-1 | $OPS_1$ | $OPS_1$ | $OPS_1$ | $OPS_1$ | $OPS_1$ | ● ● ● | Inner Parity | Die J-1 odd |

*Figure 9B*

|  | Outer Codeword 0 | Outer Codeword 1 | Outer Codeword 2 | Outer Codeword 3 | Outer Codeword 4 | | | |
|---|---|---|---|---|---|---|---|---|
| Inner Codeword 0 | $S_0$ | $S_0$ | $S_0$ | $S_0$ | $S_0$ | ◦ ◦ ◦ | Inner Parity | Chip 0 even |
| Inner Codeword 1 | $S_1$ | $S_1$ | $S_1$ | $S_1$ | $S_1$ | ◦ ◦ ◦ | Inner Parity | Chip 0 odd |
| Inner Codeword 2 | $S_2$ | $S_2$ | $S_2$ | $S_2$ | $S_2$ | ◦ ◦ ◦ | Inner Parity | Chip 1 even |
| Inner Codeword 3 | $S_3$ | $S_3$ | $S_3$ | $S_3$ | $S_3$ | ◦ ◦ ◦ | Inner Parity | Chip 1 odd |
| Inner Codeword 4 | $S_4$ | $S_4$ | $S_4$ | $S_4$ | $S_4$ | ◦ ◦ ◦ | Inner Parity | Chip 2 even |
| Inner Codeword 5 | $S_5$ | $S_5$ | $S_5$ | $S_5$ | $S_5$ | ◦ ◦ ◦ | Inner Parity | Chip 2 odd |
| Inner Codeword 2K-4 | $S_{2K-4}$ | $S_{K-4}$ | $S_{2K-4}$ | $S_{2K-4}$ | $S_{2K-4}$ | ◦ ◦ ◦ | Inner Parity | Chip V-2 even |
| Inner Codeword 2K-3 | $S_{2K-3}$ | $S_{2K-3}$ | $S_{2K-3}$ | $S_{2K-3}$ | $S_{2K-3}$ | ◦ ◦ ◦ | Inner Parity | Chip V-2 odd |
| Inner Codeword 2K-2 | $OPS_0$ | $OPS_0$ | $OPS_0$ | $OPS_0$ | $OPS_0$ | ◦ ◦ ◦ | Inner Parity | Chip V-1 even |
| Inner Codeword 2K-1 | $OPS_1$ | $OPS_1$ | $OPS_1$ | $OPS_1$ | $OPS_1$ | ◦ ◦ ◦ | Inner Parity | Chip V-1 odd |

*Figure 9C*

| | Outer Code Word 0 | | | | Outer Code Word 1 | | | | | | |
|---|---|---|---|---|---|---|---|---|---|---|---|
| Inner Codeword 0 | $S_0$ | $S_1$ | $S_2$ | $S_3$ | $S_0$ | $S_1$ | $S_2$ | $S_3$ | ● ● ● | Inner Parity | Block 0 even |
| Inner Codeword 1 | $S_4$ | $S_5$ | $S_6$ | $S_7$ | $S_4$ | $S_5$ | $S_6$ | $S_7$ | ● ● ● | Inner Parity | Block 0 odd |
| Inner Codeword 2 | $S_8$ | $S_9$ | $S_{10}$ | $S_{11}$ | $S_8$ | $S_9$ | $S_{10}$ | $S_{11}$ | ● ● ● | Inner Parity | Block 1 even |
| | | | | | | | | | ● ● ● | Inner Parity | Block 1 odd |
| Inner Codeword 2J-4 | | | | | | | | | ● ● ● | Inner Parity | Block K-2 even |
| Inner Codeword 2J-3 | | | | | | | | | ● ● ● | Inner Parity | Block K-2 odd |
| | Outer Parity | | | | Outer Parity | | | | ● ● ● | Inner Parity | Block K-1 even |
| | Outer Parity | | | | Outer Parity | | | | ● ● ● | Inner Parity | Block K-1 odd |

*Figure 10A*

| | Outer Code Word 0 | | | | Outer Code Word 1 | | | | | | |
|---|---|---|---|---|---|---|---|---|---|---|---|
| Inner Codeword 0 | $S_0$ | $S_1$ | $S_2$ | $S_3$ | $S_0$ | $S_1$ | $S_2$ | $S_3$ | ● ● ● | Inner Parity | Die 0 even |
| Inner Codeword 1 | $S_4$ | $S_5$ | $S_6$ | $S_7$ | $S_4$ | $S_5$ | $S_6$ | $S_7$ | ● ● ● | Inner Parity | Die 0 odd |
| Inner Codeword 2 | $S_8$ | $S_9$ | $S_{10}$ | $S_{11}$ | $S_8$ | $S_9$ | $S_{10}$ | $S_{11}$ | ● ● ● | Inner Parity | Die 1 even |
| | | | | | | | | | ● ● ● | Inner Parity | Die 1 odd |
| Inner Codeword 2J-4 | | | | | | | | | ● ● ● | Inner Parity | Die J-2 even |
| Inner Codeword 2J-3 | | | | | | | | | ● ● ● | Inner Parity | Die J-2 odd |
| | Outer Parity | | | | Outer Parity | | | | ● ● ● | Inner Parity | Die J-1 even |
| | Outer Parity | | | | Outer Parity | | | | ● ● ● | Inner Parity | Die J-1 odd |

*Figure 10B*

|  | Outer Code Word 0 | | | | Outer Code Word 1 | | | | | | |
|---|---|---|---|---|---|---|---|---|---|---|---|
| Inner Codeword 0 | $S_0$ | $S_1$ | $S_2$ | $S_3$ | $S_0$ | $S_1$ | $S_2$ | $S_3$ | ⋯ | Inner Parity | Chip 0 even |
| Inner Codeword 1 | $S_4$ | $S_5$ | $S_6$ | $S_7$ | $S_4$ | $S_5$ | $S_6$ | $S_7$ | ⋯ | Inner Parity | Chip 0 odd |
| Inner Codeword 2 | $S_8$ | $S_9$ | $S_{10}$ | $S_{11}$ | $S_8$ | $S_9$ | $S_{10}$ | $S_{11}$ | ⋯ | Inner Parity | Chip 1 even |
|  |  |  |  |  |  |  |  |  | ⋯ | Inner Parity | Chip 1 odd |
| Inner Codeword 2J-4 |  |  |  |  |  |  |  |  | ⋯ | Inner Parity | Chip V-2 even |
| Inner Codeword 2J-3 |  |  |  |  |  |  |  |  | ⋯ | Inner Parity | Chip V-2 odd |
|  | Outer Parity | | | | Outer Parity | | | | ⋯ | Inner Parity | Chip V-1 even |
|  | Outer Parity | | | | Outer Parity | | | | ⋯ | Inner Parity | Chip V-1 odd |

OUTER CODE PROTECTION FOR SOLID STATE MEMORY DEVICES

SUMMARY

Various embodiments of the present invention are generally directed to providing outer code word protection for solid state memory devices, such as non-volatile (NVM) memory devices. The outer code words provide protection for data blocks of memory device. In some configurations the memory device comprises a memory chip that includes multiple die. In some configurations, the memory device comprises multiple chips and each chip includes multiple die. The outer code words described herein may span multiple blocks, may span multiple die and/or may span multiple chips to providing data protection for blocks, die, and chips, respectively.

Some embodiments involve a solid state memory device that is arranged in multiple data blocks, each block comprising an array of memory cells arranged in a plurality of pages. Encoder circuitry is configured to encode data into inner code words and symbol-based outer code words. Modulator circuitry is configured to store the inner code words and the symbol-based outer code words in the memory cells of the multiple blocks. The modulator circuitry is configured to store one or more inner code words in each page of each block and to store one or more symbols of each outer code word in at least one page of each block.

For example, in some configurations, the modulator circuitry is configured to store only one outer code word symbol in one page of each of the multiple blocks. In some configurations, the symbols of the outer code word overlap the inner code words and the modulator circuitry is configured to store a plurality of outer code word symbols in one page of each of the multiple blocks.

The pages of each block may be arranged in multiple planes, with at least one symbol of each outer codeword stored in each page of the multiple planes. For example, in some configurations, the pages of each data block may be arranged in an even plane and an odd plane. The modulator circuitry is configured to store at least one symbol of each outer codeword in an even plane page of each block and at least one symbol of each outer codeword in an odd plane page of the block.

The encoder circuitry can be configured to encode the data into the outer code words using a Reed-Solomon code having dmin greater than or equal to 2.

In some configurations, the memory cells are multiple level memory cells capable of storing x bits, where x>1. In these configurations, the pages of the memory cell array may be denoted physical pages and each of the physical pages comprises a logical page for each of the x bits.

The memory device may further include demodulator circuitry configured to read the memory cells of the memory device and decoder circuitry configured to decode the inner code words and the outer code words and to correct errors in the inner code words and the outer code words. In some implementations, the decoder circuitry is configured to iterate between correcting the outer code words and correcting the inner code words.

Some embodiments involve a method of operating a solid state non-volatile memory device. The device includes multiple data blocks, each block comprising an array of memory cells arranged in a plurality of pages. Data is encoded into inner code words and outer code words and the inner code words and outer code words are stored in the solid state memory device. Each page of each block stores at least one inner code word. One or more pages of each block stores one or more symbols of each outer code word. The inner code words and the outer code words are read from the memory device. Errors in the data are corrected using the inner code words and the outer code words. An error corrected output is provided from the corrected data.

In some implementations, the memory device includes multiple memory chips and each of the multiple blocks is arranged respectively on one of the multiple chips.

Storing the inner code words and the outer code words in the memory device may involve storing a plurality of outer code word symbols in one page of each of the multiple blocks.

In some configurations, the pages of each block are arranged in multiple planes, and storing the inner code words and the outer code words in the memory device comprises storing at least one symbol of each outer codeword in each page of the multiple planes. Storing the inner code words and the outer code words in the memory device may involve storing only one outer code word symbol in one page of each of the multiple blocks.

In some implementations, the symbols of the outer code words are interleaved in each page.

Correcting errors in the data using the inner code words and the outer code words can involve iterating between correcting the outer code words and correcting the inner code words.

These and other features and aspects which characterize various embodiments of the present invention can be understood in view of the following detailed discussion and the accompanying drawings.

BRIEF DESCRIPTION OF THE DRAWINGS

FIG. 5A illustrates an arrangement of inner code words with outer code words that span multiple blocks;

FIG. 5B illustrates an arrangement of inner code words with outer code words that span multiple die;

FIG. 7A illustrates an arrangement of symbol-based outer code words that spans multiple blocks;

FIG. 7B illustrates an arrangement of symbol-based outer code words that spans multiple die of a memory IC;

FIG. 7C illustrates an arrangement of symbol-based outer code words that spans multiple chips of a memory IC;

FIG. 7D illustrates outer code parity symbols intermixed with outer code data symbols within a page;

FIG. 8 shows an arrangement of symbol-based outer code words that span multiple die, each die having multiple planes;

FIG. 9A illustrates outer code words that span the even and odd planes of multiple blocks;

FIG. 9B illustrates outer code words that span even and odd planes of multiple die;

FIG. 9C illustrates outer code words that span even and odd planes of multiple chips;

FIG. 10A shows an arrangement of multiple outer code word symbols that extend along an inner code word for outer code words that span multiple planes of multiple blocks;

FIG. 10B shows an arrangement of multiple outer code word symbols that extend along an inner code word for outer code words that span multiple planes of multiple die;

FIG. 10C illustrates multiple outer code word symbols that extend along an inner code word for outer code words that span multiple planes of multiple chips;

FIG. 15 illustrates outer code words that are interleaved within each page; and

FIG. 16 illustrates non-equal outer code word coverage of multiple inner code words encoding a page.

DETAILED DESCRIPTION

Error correction in solid state memory devices, including non-volatile memory (NVM) devices, becomes more important as the technology moves to smaller dimensions and to memory cells capable of storing multiple bits. Error correction using concatenated coding allows multiple codes to be used for enhanced error correction. Code concatenation reduces the complexity of the error correction process because it allows multiple, simpler error correction coding (ECC) to be implemented rather than a single more complex ECC. The use of concatenated inner and outer codes enhances error correction performance, allowing data to be more quickly recovered using less error protection when compared to approaches using an inner code alone. Outer codes can be arranged to protect particular logical and/or physical memory entities. For example, outer code words that span multiple blocks can be used to protect against block failures. A symbol-based outer code word that spans multiple blocks includes multiple symbols and a symbol of the outer code word is stored in each of the multiple blocks. Similarly, outer codes that span multiple die can be used to protect against die failures; outer codes that span multiple chips can be used to protect against chip failures.

Figure 1:
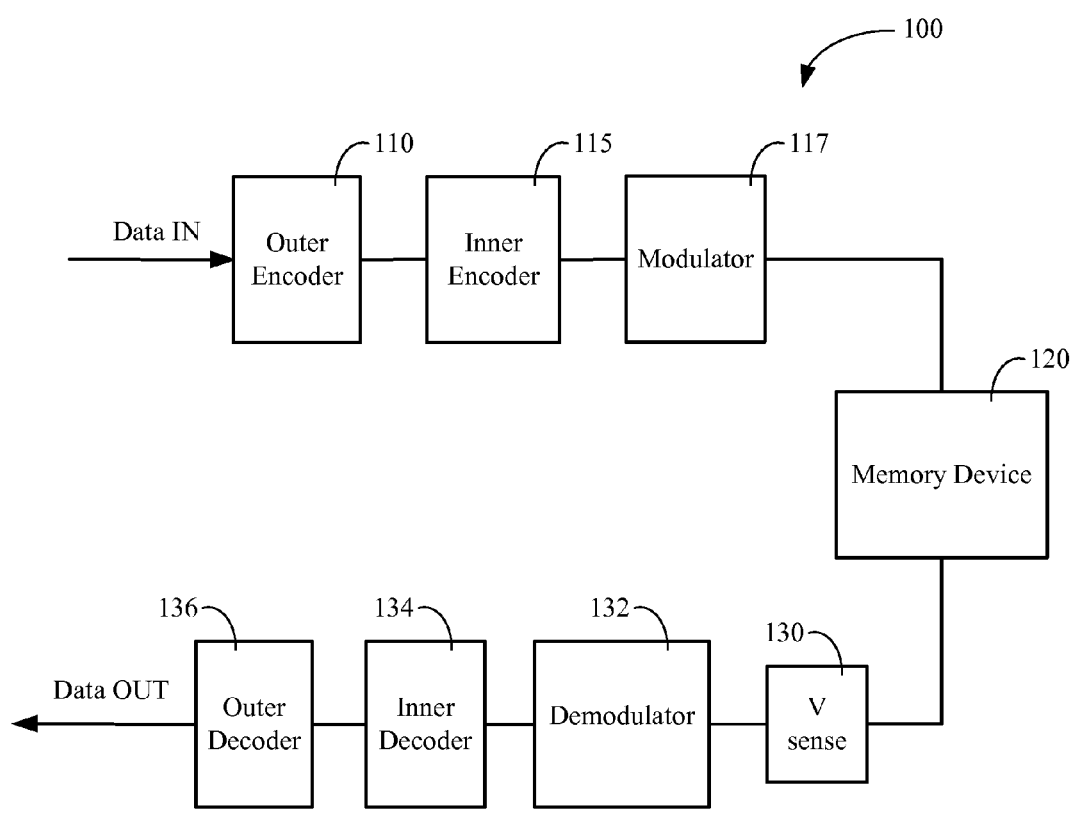
FIG. 1 is a block diagram illustrating a system configured to implement a concatenated coding scheme for a solid state memory device.

FIG. 1 is a block diagram illustrating a system configured to implement a concatenated coding scheme for a solid state memory device 120. The memory device 120 comprises a number of memory cells; each memory cell can store one or more bits of data. Incoming data is encoded using both an inner encoder 115 and an outer encoder 110. The inner encoder 115 encodes the data into inner code words and inner parity data. The outer encoder 110 encodes the data into outer coder words and outer parity data. A modulator 117 receives the encoded data and generates signals required to store the encoded data in the cells of the memory device 120.

When the stored data is accessed from the memory device, voltage sense circuitry 130 senses the voltage levels present on the cells of the memory device 120. The demodulator 132 converts the stored voltage levels to an encoded binary signal. The inner decoder 134 corrects errors in the data using the inner parity data generated by the inner encoder 115. The outer decoder 136 corrects errors in the data using the outer parity data generated by the outer encoder 110.

Figure 2A:
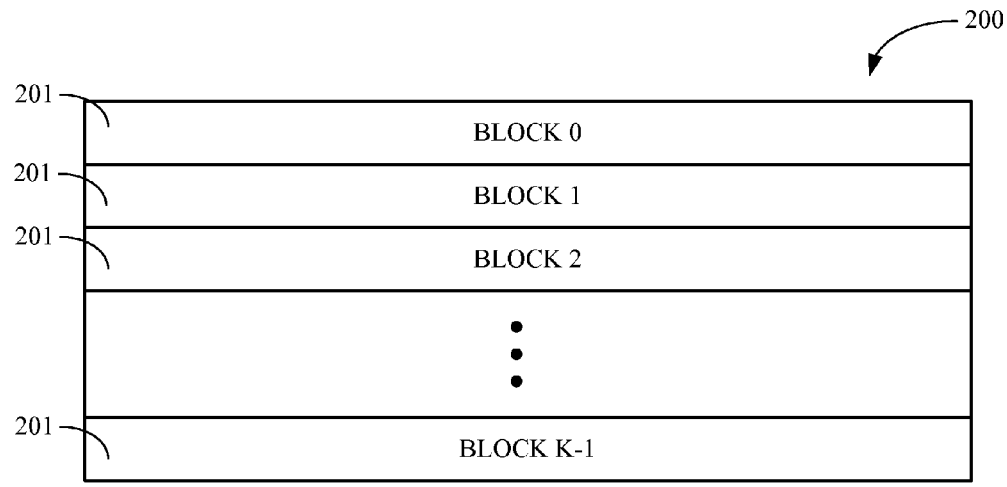
FIG. 2A illustrates a memory cell array arranged in K blocks.

A typical NVM device includes an array of memory cells, each memory cell comprising a floating gate transistor. The memory cells in an array can be grouped into larger units, such as blocks, physical pages, and logical pages. An exemplary block size includes 64 physical pages of memory cells with 16,384 (16K) memory cells per physical page. Other block or page sizes can be used. FIG. 2A illustrates a memory cell array 200 arranged in K blocks 201. The memory cell array includes the 16K memory cells fabricated on a single semiconductor die.

Figure 2B:
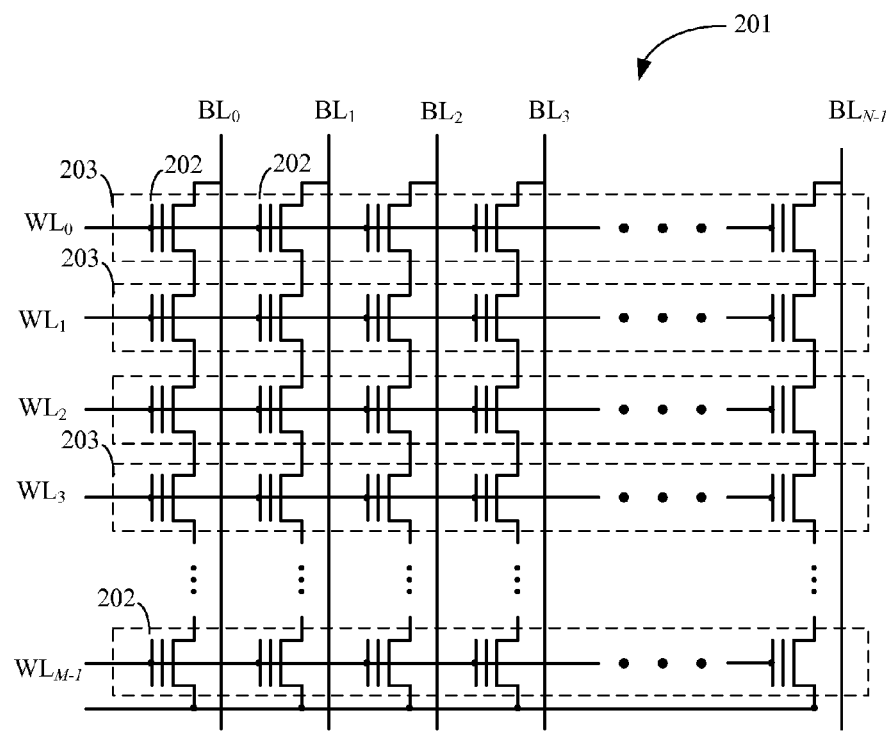
FIG. 2B illustrates the arrangement of one block of a memory cell array.

FIG. 2B illustrates one block 201 of a memory cell array. The memory cell array comprises M×N memory cells per block 201, the memory cells (floating gate transistors) 202 are arranged M rows of physical pages 203 and in columns of N NAND strings. Each physical page 203 is associated with a word line $WL_0$-$WL_{M-1}$. When a particular word line is energized, the N memory cells of the physical page 103 associated with that particular word line are accessible on bit lines $BL_0$-$BL_{N-1}$. In alternate embodiments, the memory cells of the solid state NVM may be arranged in a NOR array or in other array types, for example.

The exemplary memory array 201 may include memory cells that are capable of storing one bit per cell, or may include memory cells capable of storing two or more bits per memory cell. In general, the ability to program memory cells to a number of voltages, q, where q can represent any of $2^c$ memory states, allows c bits to be stored in each memory cell. In multi-level memory storage devices, c is greater than or equal to 2. For example, the memory cells may be programmable to four voltage levels and thus can store two bits of information per cell.

Figure 3:
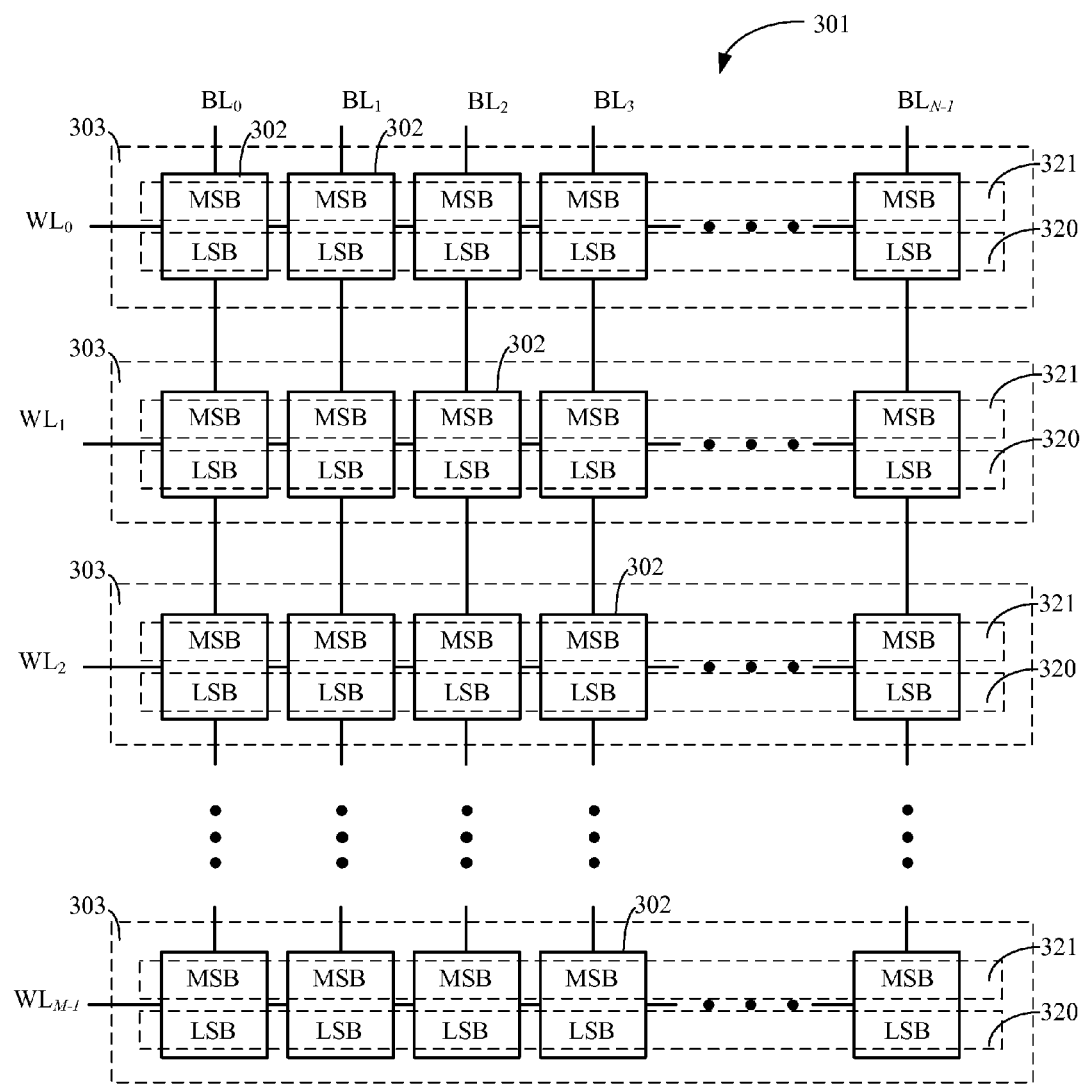
FIG. 3 illustrates the block of memory cells that are capable of storing two bits of information denoted the most significant bit (MSB) and the least significant bit (LSB)

FIG. 3 illustrates a block 301 of memory cells 302 that are capable of storing two bits of information denoted the most significant bit (MSB) and the least significant bit (LSB). Although this example involves multi-level memory cells that store two bits per memory cell, in general, multi-level memory cells may store three, four bits, five bits or even more bits per memory cell.

When multi-level memory cells are used to form the memory array, each physical page 303 associated with a word line can be subdivided into multiple logical pages 320, 321, as illustrated in FIG. 3. One logical page 320, 321 for each type of bit may be stored in the memory cells 302 of the physical page 303. Memory cell arrays that subdivide one physical page into multiple logical pages corresponding to the number of bits stored in multi-level memory cell are referred to herein as having multi-page architecture. In the exemplary memory storage array block 301 illustrated in FIG. 3, each physical page 303 associated with a word line $WL_1$-$WL_{M-1}$ is subdivided into two logical pages 320, 321. A first logical page 320 includes the LSBs of the memory cells 302 of the physical page 303. The second logical page 321 includes the MSBs of the memory cells 302 of the physical page 303. The logical pages 320, 321 associated with a physical page 303 are capable of being accessed (programmed or read) independently of each other. The LSBs stored in the memory cells of the physical page are accessed using a first logical page address and the MSBs stored in the memory cells of the physical page are accessed using a second logical page address.

In some implementations, the memory cell array can be arranged so that a word line is associated with multiple physical pages and each physical page is further subdivided into multiple logical pages according to the number of bits stored by each memory cell.

Figure 4:
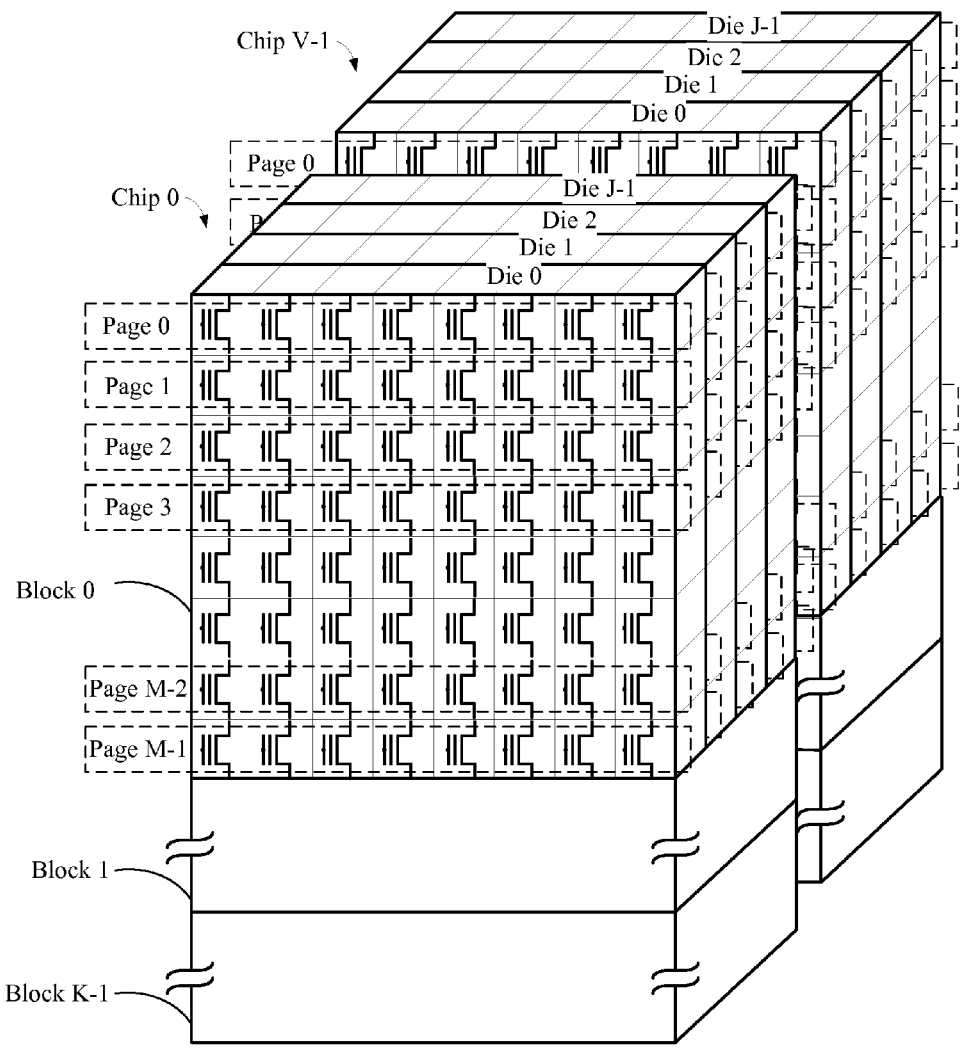
FIG. 4 illustrates an assimilation of multiple memory chips, each having multiple memory die, into an integrated circuit (IC) package.

To increase storage capacity, some memory ICs are packaged to include multiple memory chips, each memory chip having multiple memory die per memory chip, each die having multiple memory blocks per memory die. FIG. 4 illustrates an IC memory 400 that includes V memory chips, depicted in FIG. 4 as Chips 0 through Chip V-1. Each memory chip includes J die, depicted in FIG. 4 as Die 0 through Die J-1. Each die includes K blocks of memory cells, depicted in FIG. 4 as Block 0 through Block K-1. Block 0 of Die 0, Chip 0 is illustrated in detail showing the multiple memory cells per block, the memory cells of each block, are arranged in M physical pages.

An arrangement of inner and outer codes is illustrated in FIGS. 5A and 5B. FIG. 5A illustrates memory cells of a die (in this example, Die 0) arranged in multiple blocks (Block 0 through Block K-1). In this example, inner code words are stored in the $O^{th}$ page of each of Blocks 0 through Block K-2. Each of the inner code words includes data bits and inner code parity bits. The outer code is stored in Page 0 of Block K-1 of Die 0. The outer code bits are formed by performing an exclusive OR (XOR) of a bit from each block. For example, outer code bit $b0_{K-1} = b0_0 \oplus b0_1 \oplus b0_2 \oplus b0_3 \ldots b0_{K-2}$; outer code bit $b1_{K-1} = b1_0 \oplus b1_1 \oplus b1_2 \oplus b1_3 \ldots b1_{K-2}$, etc., where the subscript indicates the block. The outer code parity bit indicates an error in an odd number (such as one) of the inner code bits that are XORed to form the outer code parity bit. Any single inner code word failure can be recovered using all the other inner code words.

The diagram of FIG. 5B illustrates outer code parity that is calculated by XORing a bit from each die in an IC memory package. In this example, inner code words are stored in the $0^{th}$ page of the $0^{th}$ block of Die 0 through Die J-J. Page 0 of Block 0 of Die J-1 contains the result of XORing the inner code word bits. Outer code parity bit $b0_{J-1} = b0_0 \oplus b0_1 \oplus b0_2 \oplus b0_3 \ldots b0_{J-2}$; outer code parity bit $b1_{J-1} = b1_0 \oplus b1_1 \oplus b1_2 \oplus b1_3 \ldots b1_{J-2}$, etc., where the subscript indicates the die. Again, in this example, any single inner code word failure can be recovered using all of the inner code words.

Figure 6:
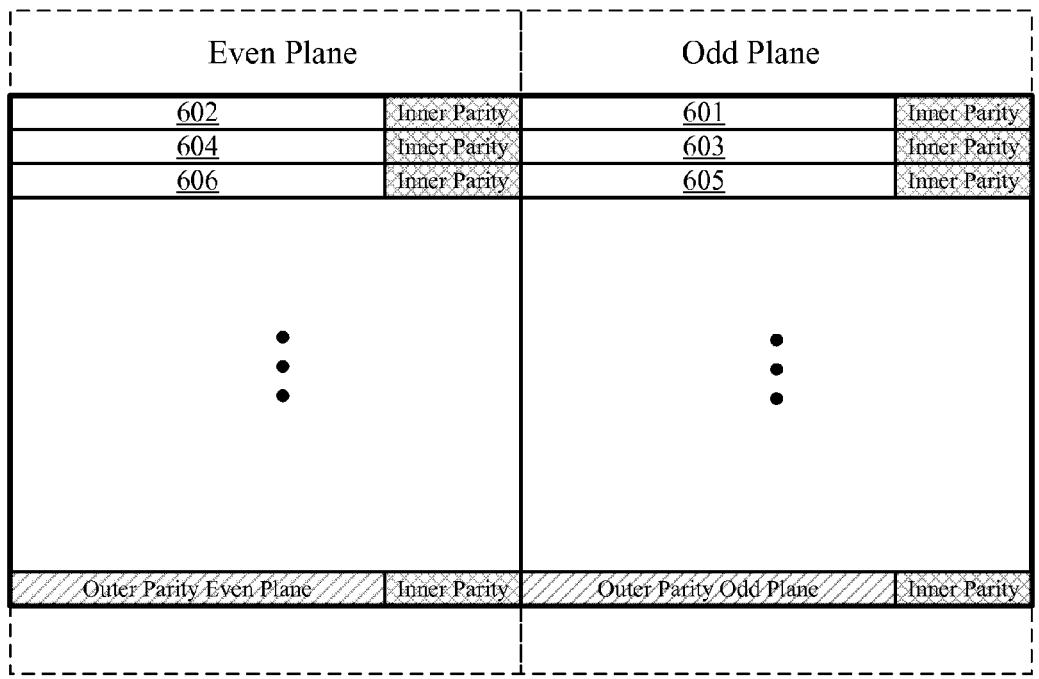
FIG. 6 shows an arrangement of inner code words and outer code words for memory blocks, die, and/or chips having multiple planes.

In some implementations, each block and/or each die is arranged in an even plane and an odd plane. Pages of the even plane may have corresponding pages in the odd plane which can be concurrently accessible. An arrangement of inner code words and outer code words for blocks or dies having multiple planes is illustrated in FIG. 6. In this scenario, each of the even plane pages 602, 604, 606 store an inner code word with inner parity bits. Each of the outer plane pages 601, 603, 605 store an inner code word with inner parity bits. The outer parity for the even plane is formed by XORing a bit from each of the even plane inner code words. The outer parity for the odd plane is formed by XORing a bit from each of the odd plane code words as illustrated in FIG. 6. For even and odd planes of a die, a die failure would invalidate both planes within a die, but since each plane is covered separately, the data can still be recovered. However, this approach may not be as robust in protecting against random inner code failures. For example, when there are two inner code failures, half of the inner code failures can be corrected if the two failures are on different planes.

One approach to improving the robustness of error correction to cover multiple inner code failures is to cover both planes with a single code having the capability to correct two errors when the error locations are known. This may be accomplished, for example, by considering the known error locations as erasures. Instead of the XOR, or single bit parity with minimum distance, dmin, of 2, a code with dmin of 3 is required, for example, a Hamming code. The overhead for using a code with dmin=3, however, is significant. For example, two plane coverage for 16 die would require a 32 bit outer code word with 6 parity bits.

An implementation that improves error correction robustness involves the use of a symbol-based outer code that spans the blocks and/or spans the die and/or spans the chips of the memory IC. Various arrangements of the outer code word are possible to provide protection against data errors. For example, in an implementation that provides protection on the block level, the symbol-based outer code word may span multiple blocks wherein each block spanned by the outer code word is arranged on a particular die of a particular chip. Outer code words that span multiple blocks, wherein the blocks spanned are arranged on different die of the same chip provide protection on the die level. Outer code words that span multiple blocks, wherein the blocks spanned are arranged on different chips provide protection on the chip level.

FIG. 7A illustrates symbol-based outer code words that span multiple blocks (Block 0 through Block K-1). In this example, the multiple blocks are arranged on the $0^{th}$ die of the $0^{th}$ chip, although it will be appreciated that, in the case of a memory IC with multiple die and multiple chips, the K blocks may be arranged on any of the die of any of the chips in the memory IC. In FIG. 7A, the arrangement of outer code words 0 through 4 and inner code words 0 through K-1 is illustrated for page 0 of each block. Although only the arrangement of the inner code words and the outer code words for page 0 is shown, inner code words and outer code words for pages 1 through N-1 may be arranged similarly to page 0.

Each inner code words 0 through K-1 include data and inner code parity bits. The last two inner code words (inner code words K-2 and K-1) are the parity symbols for the outer code words. In this implementation, two blocks of outer code parity symbols would be used.

FIG. 7B illustrates a symbol-based outer code that spans multiple die of a memory chip. In this example, the outer code words span Die 0 through Die J-1 of Chip 0. Chips 1 through V-1 may include similarly arranged outer code words. FIG. 7B illustrates outer code words 0 through 4 and inner code words 0 through J-1 for page 0 of each of the J die. Although only the arrangement of the inner code words and the outer code words for page 0 is shown, inner code words and outer code words for pages 1 through N-1 may be arranged similarly to page 0. Each inner code word 0 through J-1 includes data and inner code parity bits. The last two inner code words (inner code word J-2 and J-1) are the parity symbols for outer code words. In this implementation, die J-2 and J-1 store the outer code parity symbols.

FIG. 7C illustrates a symbol-based outer code that spans multiple chips of a memory IC. In this example, the outer code words span Chip 0 through Chip V-1. FIG. 7C illustrates outer code words 0 through 4 and inner code words 0 through J-1 for Page 0 of Die 0. Die 1 through Die J-1 may be similarly arranged. The outer code parity symbols for each outer code word are designated $OP_0$ and $OP_1$. Furthermore, although only the arrangement of the inner code words and the outer code words for page 0 is shown, inner code words and outer code words for pages 1 through N-1 may be arranged similarly to page 0. Each inner code word 0 through V-1 includes data and inner code parity bits. The last two inner code words (inner code word V-2 and V-1) are the parity symbols for outer code words. In this implementation, Chips V-2 and V-1 store the outer code parity symbols.

In some configurations, the outer code words are constructed so that the outer code word parity symbols are intermixed with the data symbols within a page. In this arrangement, the outer code word symbols are not segregated into pages that only store data and pages that only store parity. An implementation in which parity symbols are intermixed with data symbols within a page is illustrated in FIG. 7D. FIG. 7D shows the $0^{th}$ pages of die 0 through die 11 in which outer code words 0 through 4 encode the $0^{th}$ pages. Additional pages on each die may be similarly arranged. The outer code word parity symbols are intermixed with the data symbols on each page. The arrangement illustrated in FIG. 7D can be contrasted with that of FIG. 7B where the outer code data and parity symbols are not intermixed. In FIG. 7B, two pages (the $0^{th}$ pages of die J-2 and die J-1) store all parity symbols ($OPS_0$, $OPS_1$) of the outer code words. Intermixing data and parity may be used for outer code words that span various memory entities, e.g., chips, blocks, etc., and may be used for bit and/or symbol based outer code words, including the exemplary arrangements described herein.

In some implementations, the multiple planes of a chip, die or block are spanned by the symbol-based outer code words. FIG. 8 illustrates an arrangement of symbol-based outer code words spanning multiple die having multiple planes. It will be appreciated that a similar arrangement of symbol-based outer code words may be used to span multiple data blocks having multiple planes or multiple memory chips having multiple planes. FIG. 8 depicts a memory IC having J die, wherein each die is divided into an even plane and an odd plane. Each even plane page stores inner code words 800, 802, 804, 806, 808, 810, 812, 814 and each odd plane page stores inner code words 801, 803, 805, 807, 809, 811, 813. The inner code words include data and parity. Thus, page 0 of the even plane of Die 0 stores an inner code word 800 and page zero of the odd plane of Die 0 stores an inner code word 801. Page one of the even plane of Die 1 stores an inner code word 802 and page one of the odd plane of Die 1 stores an inner code word 803, and so forth. For example, there may be G outer code words that span the even plane pages of the J die and there G outer code words that span the odd plane pages of the J die. The even plane outer code words include pages 812, 814 of outer parity symbols $OPS_0$ and $OPS_1$, which are stored in the even plane of die J-2 and J-1. The odd plane outer code words include pages 813, 815 of outer parity symbols $OPS_0$ and $OPS_1$ which are stored in and the odd plane of die J-2 and J-1.

In some implementations, the outer code words can span both planes of the blocks, die, or chips as illustrated in FIGS. 9A 9B, and 9C, respectively. Note that FIG. 8 illustrates the outer code words that span one plane of multiple die. In contrast to the scenario of FIG. 8, FIGS. 9A, 9B and 9C illustrate outer code words that span multiple planes of multiple blocks, die or chips, respectively. FIG. 9A illustrates outer code words 0-4 that span the even and odd planes of Blocks 0 through K-1. Symbol $S_0$ of outer code word 0 is stored in inner code word 0 of the even plane of Block 0 and symbol $S_1$ of outer code word 0 is stored in inner code word 1 of the odd plane of Block 0; symbol $S_2$ of outer code word 0 is stored in inner code word 2 of the even plane of Block 1 and symbol $S_3$ of outer code word 0 is stored in inner code word 3 of the odd plane of Block 1, and so forth. The outer parity symbols OPS0 and OPS1 are stored in inner code word 2K-2 of the even plane of Block K-1 and in inner code word 2K-1 of the odd plane of Block K-1, respectively.

FIG. 9B illustrates outer code words that span the even and odd planes of Die 0-Die J-1. Symbol $S_0$ of outer code word 0 is stored in inner code word 0 of the even plane of Die 0, symbol $S_1$ of outer code word 0 is stored in inner code word 1 of the odd plane of Die 0, symbol $S_2$ of outer code word 0 is stored in inner code word 2 of the even plane of Die 1, and symbol $S_3$ of outer code word 0 is stored in inner code word 3 of the odd plane of Die 1, and so forth. The outer parity symbols OPS0 and OPS1 are stored in inner code word 2J-2 of the even plane of Die J-1 and in inner code word 2J-1 of the odd plane of Die J-1, respectively.

FIG. 9C illustrates a configuration that includes outer code words that span the even and odd planes of Die 0 of Chip 0-Chip V-1. FIG. 9C only shows the arrangement for Die 0 of Chips 0 through V-1, y those skilled in the art will understand that a similar arrangement may be implemented for each die of Chips 0 through V-1.

The use of a Reed-Solomon outer code with dmin greater than or equal to 2 allows for the correction of errors without knowing the location of the errors. For example, with two planes per block (or two planes per die) and two parity symbols per outer code word, all single symbol errors within one outer code word can be recovered if no two errors occur in the same code word.

At higher bit error rates, the probability of having two or more errors in the same outer code word may be significant. In these situations, extending multiple symbols of the outer code words along an inner code word may be helpful. An arrangement that includes multiple outer code word symbols extending along an inner code word for outer code words that span multiple planes of multiple blocks is illustrated in FIG. 10A. FIG. 10A illustrates two outer code words having symbols that extend along inner code words, although it is to be understood that additional outer code words and/or inner code words may be used. Each of the outer code words has 12 symbols that extend along three inner code words. As illustrated in FIG. 10A, symbols $S_0$, $S_1$, $S_2$, $S_3$ of outer code words 0 and 1 extend along inner code word 0 of the even plane of block 0; symbols $S_4$, $S_5$, $S_6$, $S_7$ of outer code words 0 and 1 along inner codeword 1 of the odd plane of block 0, and symbols S8, S9, S10, S11 of outer code words 0 and 1 extend along inner code word 2 of the even plane of block 1, etc. The odd and even planes of block JK-1 store the outer code word parity symbols. FIGS. 10B and 10C illustrates similar arrangements, except that the outer code words span multiple die (FIG. 10B) or multiple chips (FIG. 10C), rather than multiple blocks as illustrated in FIG. 10A.

The systems and methods described herein involving the use of concatenated inner and outer codes provide the capability to continue data recovery even when some of the outer code words are not correctable. Corrected data from the outer code words that are correctable can be used to recover some of the inner code words that originally failed. Correcting a fraction of the bits in error at a time, in many cases, will be sufficient to gradually reduce the number errors by repeated iterations until all the errors are corrected. This approach enhances error correction because only some of the outer code words need to be corrected in the first iteration.

Figure 11:
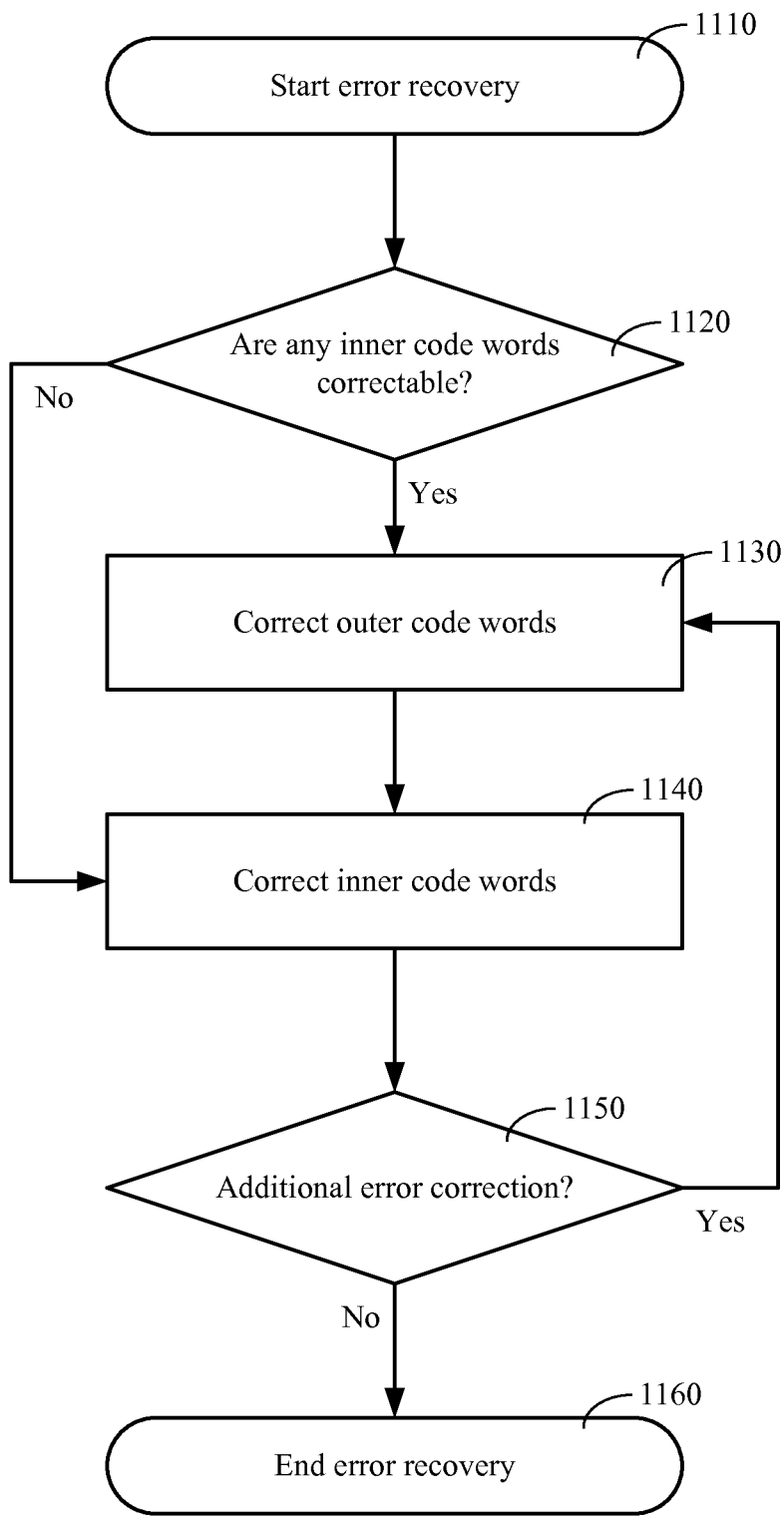
FIG. 11 is a flow diagram illustrating an error recovery process that includes iterating between correcting the outer code words and correcting the inner code words.

An error recovery process that includes iterating between correcting the outer code words and correcting the inner code words is illustrated by the flow diagram of FIG. 11. Error recovery begins 1110, followed by a determination that one or more inner code words are correctable 1120. If some or all of the inner code words are correctable, then the inner code words are corrected 1140. If additional error correction is possible 1150, then the outer code words are corrected 1130 followed by correction of the inner code words 1140. The error correction process ends 1160 when no additional error correction is possible or when the maximum number of iterations occur or upon process time out.

Figure 12A:
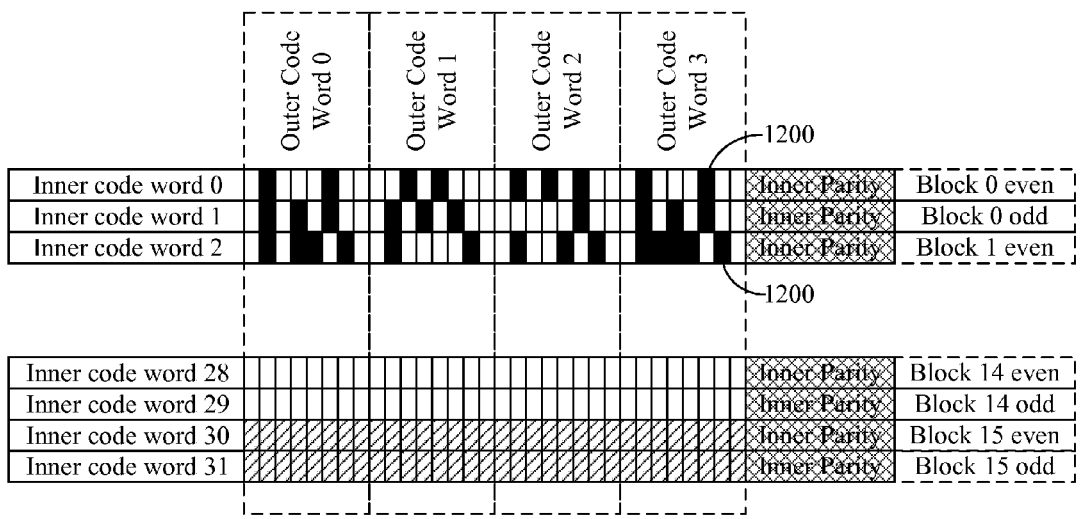
FIGS. 12A-12C illustrate an error recovery process that uses correction of the outer code words to facilitate correction of the inner code words.
Figure 12B:
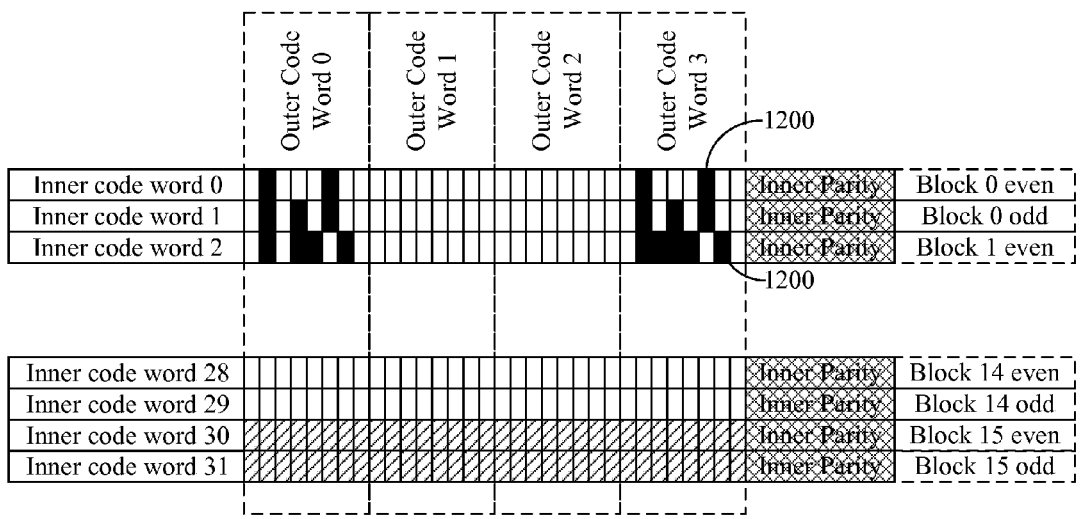
Figure 12C:
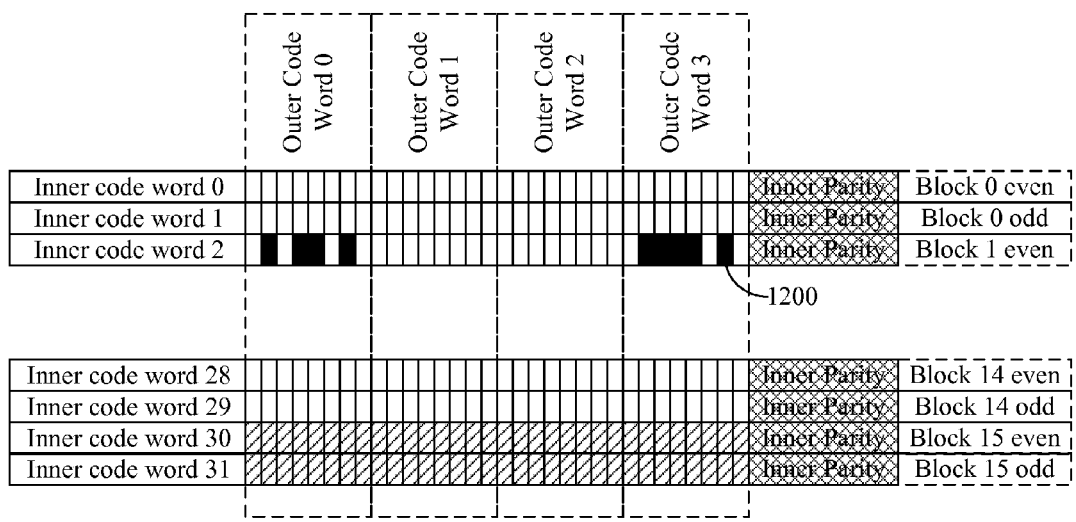

An error recovery process that uses correction of the outer code words to facilitate correction of the inner code words is further illustrated in FIGS. 12A-12C. FIG. 12A shows an example of data that is not recoverable without iterations between correcting the outer code words and correcting the inner code word. In the example illustrated in FIG. 12A, each inner code can correct eight errors, and each outer code can correct eight errors. Each shaded rectangle in FIGS. 12A-12C indicates an error 1200. Inner code words 0-2 have errors that are not correctable using the inner code words because each of these inner code words has more than eight errors and are therefore not correctable. Outer code words 0 and 3 also have more than eight errors and are not correctable. However outer code words 1 and 2 have fewer than eight errors and are correctable. Correcting outer code words 1 and 2 and then using these corrections to facilitate correcting the inner code words is beneficial, as illustrated in FIG. 12B. After outer code words 1 and 2 are corrected, on the second inner code words correction iteration, inner code words 0 and 1 can now be corrected, as shown in FIG. 12C. The remaining errors illustrated in FIG. 12C are correctable because, although inner code word 2 includes more than eight errors, outer code words 0 and three contain less than eight errors and are therefore correctable.

Figure 13:
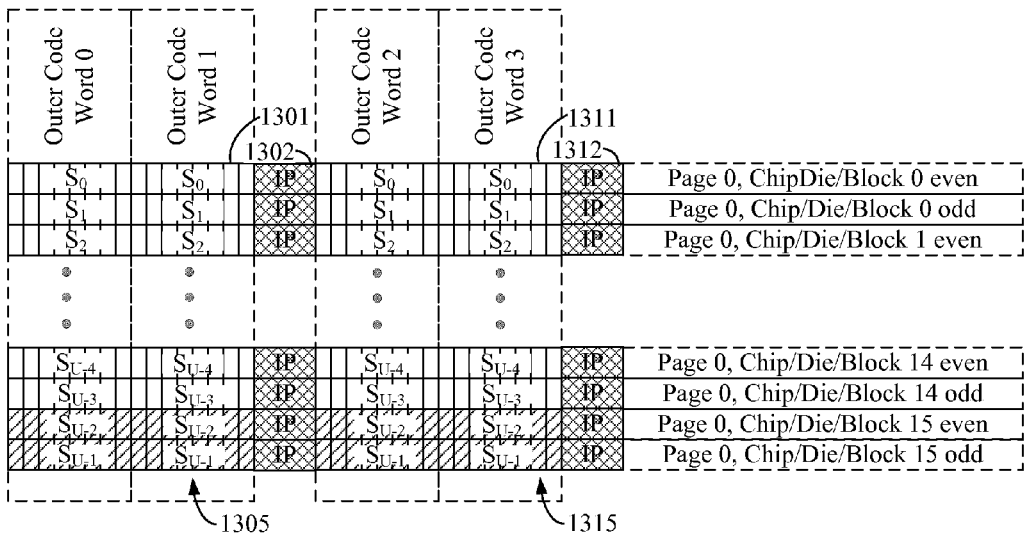
FIG. 13 illustrates an arrangement that uses smaller inner code words to protect each page of the memory with multiple concatenated codes.

In some practical applications, it is desirable and less expensive to use smaller code words and to protect each page of the memory with multiple inner code words and outer code words. An arrangement using multiple concatenated codes in this manner is illustrated in FIG. 13. FIG. 13 illustrates page 0 of even and odd planes of a block, die, or chip. Additional pages, e.g., pages 1 through M-1, of the block, die or chip may be arranged similarly, although for illustration purposes only page 0 is shown in FIG. 13. In various configurations, the outer code words may span the even and odd planes of multiple chips, multiple die or multiple blocks.

In this example, there are two inner code words 1305, 1315 per page, although more inner code words per page are possible Inner code word 0 1305 and an Inner code word 1 1315 each include data bits 1301 and inner code parity bits (IP) 1302. Outer code words 0 through 3 may be symbol-based as depicted in FIG. 13. Each outer code word has U symbols, denoted $S_0$ through $S_{U-1}$. Symbols $S_0$ through $S_{U-3}$ are outer code data symbols and symbols $S_{U-2}$ and $S_{U-1}$ are outer code parity symbols. Outer code word 0 and Outer code word 1 each span the $0^{th}$ inner code words 1305 of the $0^{th}$ pages for the odd and even planes of each chip, die, or block. Outer code word 2 and outer code word 3 each span the $1^{st}$ inner code words 1315 of the $0^{th}$ page of each chip, die or block. Note that the inner and outer code words of additional pages, (e.g., pages 1 through M-1) which are not shown in FIG. 13, may be similarly arranged.

Figure 14:
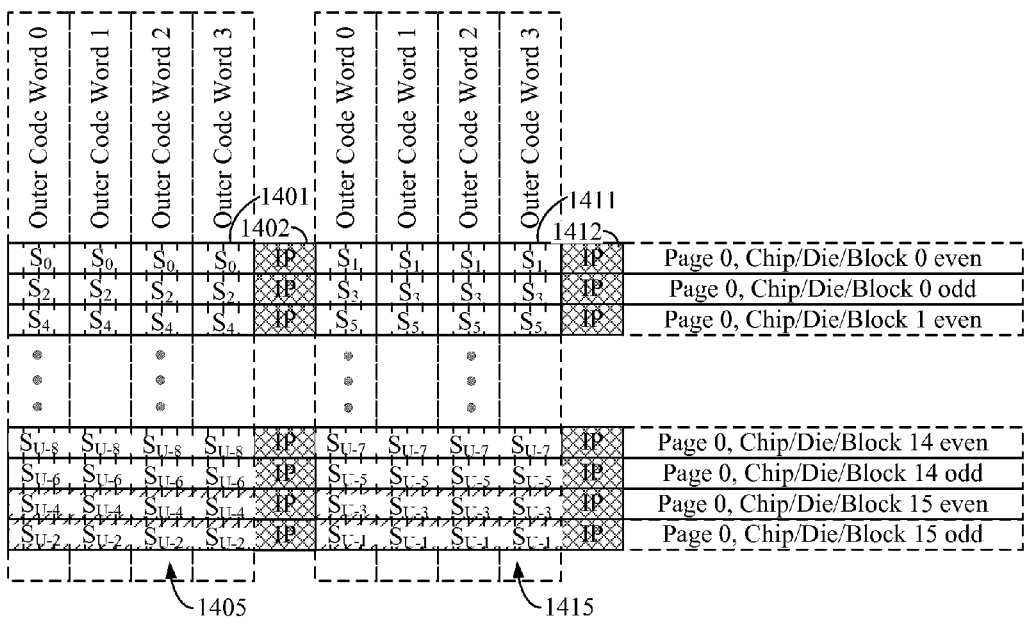
FIG. 14 shows an arrangement that spreads an outer code word over multiple inner code words.

Another implementation is illustrated in FIG. 14. This implementation spreads each outer code word over all of the inner code words of a page so that each inner code failure impacts a smaller portion of the outer code word. In various configurations, the outer code words may span the even and odd planes of multiple chips, multiple die or multiple blocks. For example, FIG. 14 illustrates symbol-based outer code words that span both inner code words of a page of even and odd planes of each chip, die or block. Using this arrangement, each inner code word of a page is protected by each outer code word. FIG. 14 illustrates the arrangement of inner code words and outer code words for page 0 of even and odd pages of a block, die or chip. In this example, although only the $0^{th}$ page of each chip, die, or block is shown, additional pages, e.g., pages 1 through M-1 may be arranged similarly.

The example of FIG. 14 includes two inner code words 1405, 1415 per page, although more inner code words per page may be used. Each inner code word 1405, 1415 includes data bits 1401, 1411 and parity bits 1402, 1412. Outer code words 0 through 3 may be symbol-based, each having U symbols as shown in FIG. 14. For example, in FIG. 14, each outer code word 0 through 3 spans both the $0^{th}$ inner code word 1405 and the $1^{st}$ inner code word 1415 of each page 0 of the even and odd planes of the chip, die or block. For each outer code word 0 through 3, outer code symbols $S_0$ through $S_{U-5}$ are outer code data symbols and outer code symbols $S_{U-4}$ through $S_{U-1}$ are outer code parity symbols. As illustrated in FIG. 14, symbol $S_0$ of outer code word 0 is arranged in inner code word 0 1405, symbol $S_1$ of outer code word 0 is arranged in inner code word 1 1415, symbol $S_2$ of outer code word 0 is arranged in inner code word 0 1405, symbol $S_3$ is arranged in inner code word 1 1415, and so forth.

Figures 15, 16:
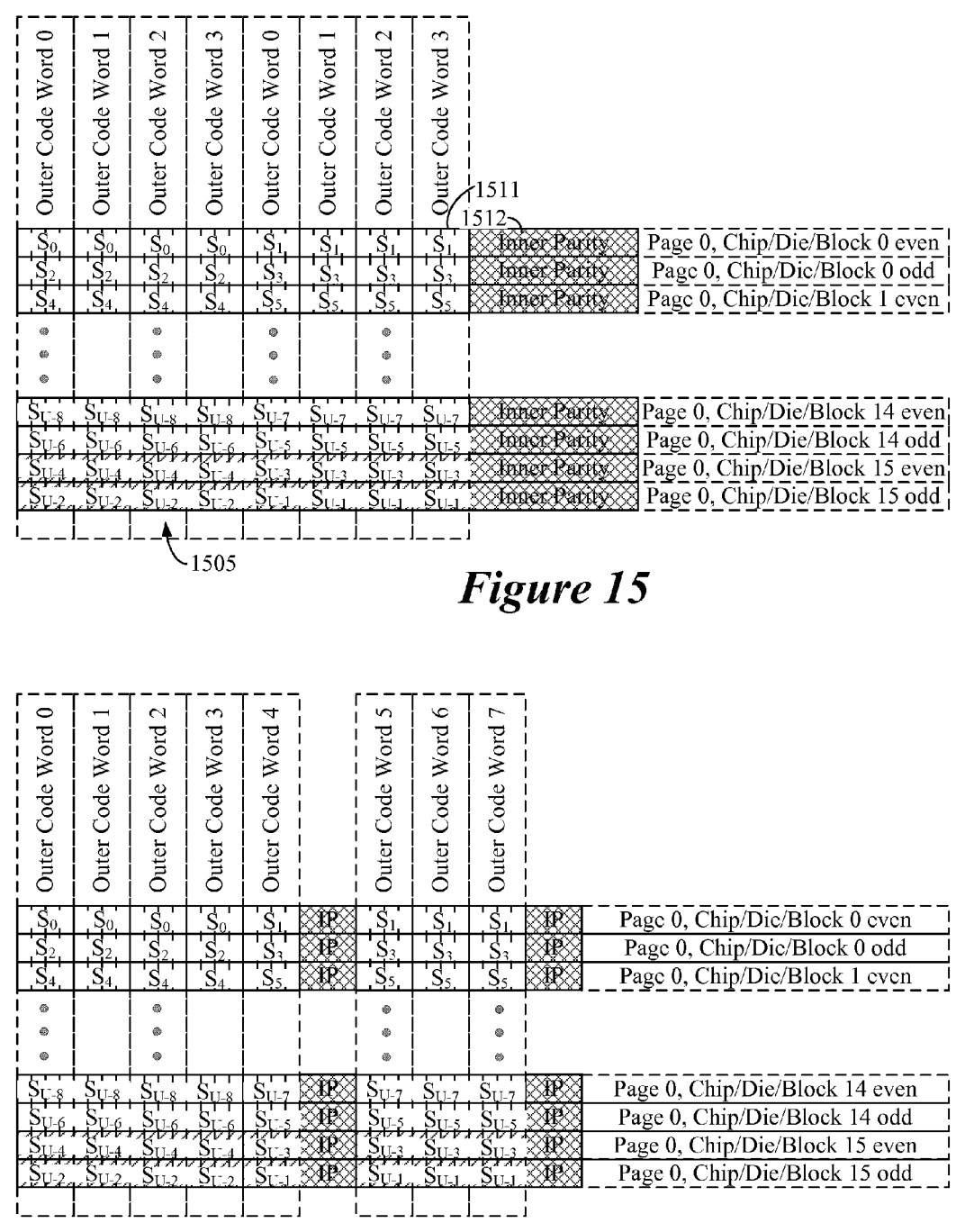

FIG. 15 shows an alternate approach which involves interleaving the outer code words within a page. In various configurations, the outer code words may span the even and odd planes of multiple chips, multiple die or multiple blocks. The example of FIG. 15 illustrates one inner code word per page, although a greater number of inner code words per page may be used. Each inner code word 1501 includes data bits 1511 and parity 1512. The outer code words may be symbol-based, each outer code word comprising U symbols. In this example, the outer code words span the $0^{th}$ pages of even and odd planes of a chip, a die or a block. The symbols of the outer code words are interleaved within each of the $0^{th}$ pages. For example, the symbols $S_0$ and $S_1$ of each outer code word are interleaved in page 0 of the even plane of the $0^{th}$ chip, die or block; the symbols $S_2$ and $S_3$ of each outer code word are interleaved in page 0 of the odd plane of the $0^{th}$ chip die or block; the symbols $S_4$ and $S_5$ of each outer code word are interleaved in page 0 of the even plane of the $1^{st}$ chip, die, or block, and so forth.

When multiple inner code words are used per page, the number of outer code words covering the inner code words need not be exactly equal. FIG. 16 illustrates one configuration that includes an unequal number of outer code words for each inner code word of a page, although other implementations of unequal outer code word coverage are possible. In FIG. 16 each page is encoded by two inner code words. The first group of inner code words is covered by five outer code words (outer code words 0 through 4) and the second group of inner code words is covered by three outer code words (outer code words 5 through 7.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A solid state memory device, comprising:
   multiple data blocks, each block comprising an array of memory cells arranged in a plurality of pages;
   encoder circuitry configured to encode data into inner code words and symbol-based outer code words; and
   modulator circuitry configured to store the inner code words and the symbol-based outer code words in the memory cells of the multiple blocks, the modulator circuitry configured to store one or more inner code words in each page of each block and to store one or more symbols of each outer code word in at least one page of each block.

2. The device of claim 1, further comprising multiple die, each of the multiple blocks is arranged respectively on one of the multiple die.

3. The device of claim 1, wherein the modulator circuitry is configured to store only one outer code word symbol in one page of each of the multiple blocks.

4. The device of claim 1, wherein the modulator circuitry is configured to store a plurality of outer code word symbols in one page of each of the multiple blocks.

5. The device of claim 1, wherein:
the pages of each block are arranged in multiple planes; and
at least one symbol of each outer codeword is stored in each page of the multiple planes.

6. The device of claim 1, wherein:
the pages of each block are arranged in an even plane and an odd plane; and
the modulator circuitry is configured to store at least one symbol of each outer codeword in an even plane page of each block and at least one symbol of each outer codeword in an odd plane page of the block.

7. The device of claim 1, wherein the encoder circuitry is configured to encode the data into the outer code words using a Reed-Solomon code having minimum distance, dmin, greater than or equal to 2.

8. The device of claim 1, wherein the memory cells comprise multiple level memory cells capable of storing x bits, where x>1.

9. The device of claim 8, wherein the pages of the memory cell array are physical pages and each of the physical pages comprises a logical page for each of the x bits.

10. The device of claim 1, further comprising:
demodulator circuitry configured to read the memory cells of the memory device; and
decoder circuitry configured to decode the inner code words and the outer code words and to correct errors in the inner code words and the outer code words.

11. The device of claim 10, wherein the decoder circuitry is configured to iterate between correcting the outer code words and correcting the inner code words.

12. A method of operating a solid state memory device including multiple blocks, each block comprising an array of memory cells arranged in a plurality of pages, the method comprising:
encoding data into inner code words and outer code words, the inner code words comprising data and parity information, each page of each block storing at least one inner code word, the outer code words comprising data symbols and parity symbols, one or more pages of each block storing one or more symbols of each outer code word;
reading the inner code words and the outer code words from the memory device;
correcting errors in the data using the inner code words and the outer code words; and
providing an error corrected output from the corrected data.

13. The method of claim 12, wherein the memory device includes multiple memory chips and each of the multiple blocks is arranged respectively on one of the multiple chips.

14. The method of claim 12, wherein storing the inner code words and the outer code words in the memory device comprises storing a plurality of outer code word symbols in one page of each of the multiple blocks.

15. The method of claim 12, wherein the pages of each block are arranged in multiple planes, and storing the inner code words and the outer code words in the memory device comprises storing at least one symbol of each outer codeword in each page of the multiple planes.

16. The method of claim 12, wherein the outer code words comprise a Reed-Solomon code having minimum distance, dmin, greater than or equal to 2.

17. The method of claim 12, storing the inner code words and the outer code words in the memory device comprises storing only one outer code word symbol in one page of each of the multiple blocks.

18. The method of claim 12, wherein the memory cells comprise multiple level memory cells capable of storing x bits, where x>1.

19. The method of claim 12, wherein symbols of the outer code words are interleaved in each page.

20. The method of claim 12, wherein correcting errors in the data using the inner code words and the outer code words comprises iterating between correcting the outer code words and correcting the inner code words.

* * * * *